Sept. 16, 1930.                G. H. EARMAN                1,775,896
         MEANS FOR REMOVING ODOR AND FLAVOR OF GARLIC FROM MILK
                          Filed May 7, 1929
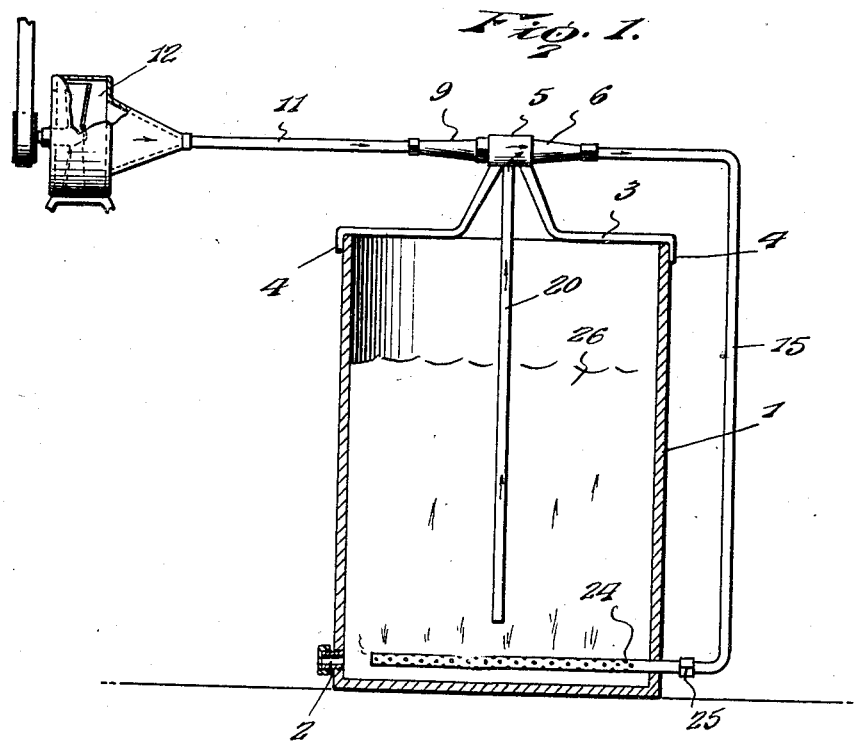
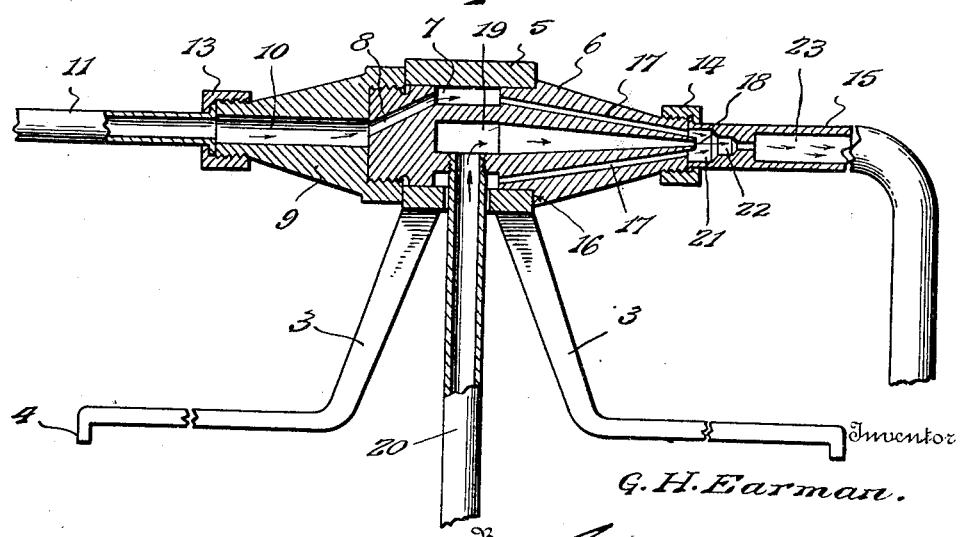
Inventor
G. H. Earman.
By Lacey & Lacey, Attorneys Patented Sept. 16, 1930

1,775,896

UNITED STATES PATENT OFFICE

GEORGE H. EARMAN, OF HARRISONBURG, VIRGINIA

MEANS FOR REMOVING ODOR AND FLAVOR OF GARLIC FROM MILK

Application filed May 7, 1929. Serial No. 361,134.

It is well known that in the spring season garlic grows profusely in the fields and pastures and cows grazing therein eat the garlic with the grass so that the milk produced is strongly tainted with the odor and flavor of garlic which is very obnoxious to a great many people. The odor and flavor of garlic is carried into butter produced from the milk, making the butter distasteful. It is the object of the present invention to provide simple means whereby the odor and flavor of the garlic will be removed from the milk and the milk rendered palatable to all persons. The object of the invention is attained in such a mechanism as is illustrated in the accompanying drawing, and the invention resides in certain novel features which will be particularly pointed out in the appended claims.

In the drawing:

Figure 1 is a sectional elevation of an apparatus embodying the invention, and

Fig. 2 is an enlarged longitudinal section through a portion of the conduit through which the milk is caused to circulate.

In carrying out the invention, there is provided a reservoir or tank 1 which may be of any suitable material and of substantial proportions so that it will contain a large quantity of the milk to be treated. This tank is provided with a clean out opening 2 at or near its bottom and upon the top of the tank is supported a bracket or spider 3 consisting of radially extending arms provided with down-turned ends 4 whereby they are adapted to rest on the edge of the tank or reservoir and fit against the outer wall thereof so that lateral movement will be prevented. The inner ends of the arms are turned upwardly and meet in a central hub 5 within which is fitted a coupling sleeve or body 6 having an annular groove 7 in its external surface and having a port or passage 8 formed through its inner end to establish communication with said annular groove at one side thereof. The inner end of the coupling body 6 is externally threaded, as shown, whereby to be engaged with the wider end of an inlet nozzle 9 having a central bore 10 leading to the port 8, as clearly shown in Fig. 2. To the outer end of the nozzle 9 is coupled one end of a blow pipe 11 which forms the outlet from a fan or blower 12 of any approved form. The nozzle 9 is externally tapered, as clearly shown, and its smaller end receives a coupling collar 13 whereby a slip joint connection with the blow pipe is formed. The coupling body 6 is also tapered outwardly and a slip joint coupling collar 14 is connected therewith to hold to the coupling body one end of a circulating pipe 15. It will be noted that the end of the coupling nozzle 9 abuts one end of the hub 5 and that an annular shoulder 16 is formed on the coupling body 6 to abut the opposite end of the hub whereby the parts will be firmly assembled when the nozzle 9 is turned home, the hub being clamped between the end of the nozzle and the shoulder 16 is an obvious manner. Leading from the annular groove 7 to and through the reduced end of the coupling body 6 are ports 17 which are of restricted diameter and are provided in any desired number in converging relation so that they are brought close together at the discharge or reduced end of the body, a small nipple 18 being formed on the end of the body within the circular series of ports 17, as shown in Fig. 2. The coupling body 6 is also formed with a central bore or passage 19, the inner end of which is much larger than its outer or discharge end, the bore or passage gradually reducing in diameter toward its discharge end, which end extends through the small nipple 18. In the side of the coupling body is an opening communicating with the inner end of the bore 19 and receiving the upper end of a pipe 20 which depends therefrom into the tank or reservoir and terminates near the bottom of the same. The circulating pipe 15 has its bore enlarged to form a chamber 21 at its receiving end around the discharge ends of the passages 17 and the bore 19 and from the outlet side of this chamber a reduced bore 22 extends, said reduced bore opening abruptly into an expanded bore 23, which expanded bore continues through the remaining length of the circulating pipe. The circulating pipe extends down alongside the tank and its lower end is carried through the side of the tank immediately above the bottom thereof and provided with a large number of perforations 24 through which the air and milk may escape. For convenience in assembling the parts, the perforated terminal of the circulating pipe is formed as a separate member and a coupling 25 is provided to connect the same with the main section of the pipe.

In use, the tank is filled or nearly filled with the milk, as indicated at 26. The parts being assembled as shown and described, the fan or blower is operated so as to send a strong current of air through the coupling body and the circulating pipe. The blast of air meeting the passage 8 and finding the same to be its only outlet will be subjected to increased pressure and will flow through said passage at an increased velocity, emerging therefrom into the annular groove or chamber 7 and expanding in said groove. From the groove the air under pressure will escape through the several restricted passages 17 and will emerge therefrom with considerable force to flow into the chamber 21 and thence through the bore of the circulating pipe. The flow of the compressed air past the minute nipple 18 will create a strong suction through the bore 19 and the pipe 20 which has an open lower end so that the milk will be sucked up through said pipe and through the bore 19 into the circulating pipe, being intimately commingled with the compressed air in the chamber 21 so that it will be thoroughly aerated. The air under pressure will, of course, flow through the circulating pipe and escape through the perforations 24 into the lower portion of the body of milk within the tank and the milk which has been drawn up through the pipe 20 will be caused to circulate through the pipe 15 with the compressed air, the joint circulation of the air and the milk causing them to thoroughly commingle and effect a complete aeration of the milk, and the milk-laden air rising through the body of milk will eventually escape through the top surface thereof and apparently carries with it all of the objectionable odor and flavor. The device has operated very successfully as I have freed a large quantity of milk of all objectionable odors and taste in a very short period of time.

Having thus described the invention, I claim:

1. Means for the purpose set forth comprising a tank, a circulating pipe having a delivery end located within the tank at the bottom thereof, means for effecting a flow of air under pressure through said pipe, and a suction pipe located within the tank and communicating with the circulating pipe above the tank, the lower end of said suction pipe being open and spaced from the bottom of the tank.

2. Apparatus for the purpose set forth comprising a tank, a circulating pipe having a perforated terminal disposed within the tank at the bottom of the same and having a contracted bore at its opposite end, a coupling body connected to the circulating pipe at the last-mentioned end thereof having a plurality of restricted passages discharging into the reduced bore of the pipe and a central passage also discharging into said bore, a suction pipe having its upper end secured in said body and in communication with said central passage and depending therefrom within the tank, and means for delivering a blast of air to the restricted passages in said body.

In testimony whereof I affix my signature.

GEORGE H. EARMAN. [L. S.]